Sept. 29, 1970      C. O. BADGETT      3,531,638

RADIATION FILL GAUGE

Filed Oct. 23, 1965

INVENTOR.
CHARLES O. BADGETT

BY

*James J. O'Reilly*

AGENT

United States Patent Office 3,531,638
Patented Sept. 29, 1970

3,531,638
RADIATION FILL GAUGE
Charles O. Badgett, Columbus, Ohio, assignor to Industrial Nucleonics Corporation, a corporation of Ohio
Filed Oct. 23, 1965, Ser. No. 503,887
Int. Cl. G01n 23/10; G01t 1/17
U.S. Cl. 250—43.5                                    5 Claims

ABSTRACT OF THE DISCLOSURE

A nucleonic material fill gauge for a vessel is provided by mounting a radiation detector responsive to radiation from any direction in the center of the vessel. A coating of radioactive material is deposited around the inside walls of the vessel to direct radiation through the material, regardless of its orientation, toward the centrally-located detector. In a specific embodiment, the detector comprises a sphere of scintillating material coupled to a photomultiplier to provide a signal indicative of material fill.

---

This invention relates generally to gauges for determining the amount of fill material in a vessel and, more particularly, to an improved radiation gauge for measuring the quantity of material in a vessel irrespective of how the material may be spatially distributed within the vessel.

INTRODUCTION

Many types of fill gauges have been designed to measure the amount of material in a vessel. Usually, the height of fill is measured by mechanical or electromechanical devices. Recently, material fill has been measured by using various radiation absorption techniques. In most of these radiation methods, a radioactive source and a radiation detector are positioned on opposite sides of the vessel to be measured so that radiation passing through the vessel toward the detector is modified by the interposed material. A reduction in detected radiation occurs as more material is placed in the vessel.

These radiation gauging techniques are limited by certain geometrical problems. For example, a single source and detector cannot usually be placed to measure radiation continuously passing through the material. An aircraft fuel tank presents a problem since the fuel will relocate and slosh around the tank depending on the maneuvers of the aircraft. The fuel supply of an orbiting space vehicle is likewise difficult to measure because, in a zero-G environment, materials tend to distribute themselves randomly around the confining vessel. Since the source-detector path is fixed, it is likely that, under certain flight conditions, there will be no fuel between the source and the detector. A depleted fuel supply will be indicated even though enough fuel is left for the mission.

GENERAL DESCRIPTION OF PRIOR ART

An attempt has been made to overcome this problem by using multiple sources and detectors. U.S. Pat. 2,952,-774, issued Sept. 13, 1960 to D. F. Howard and U.S. Pat. 2,830,183, issued Apr. 8, 1958 to L. Wolfe both describe a system wherein a plurality of radioactive sources are positioned partially around an aircraft fuel tank. A single radiation detector is placed on the opposite side of the tank to receive radiation from all of the sources. The source and detector emplacements are critical and are determined (in the Howard patent) by a computer for tanks of different size and shape. The curie strength of the sources must be large to insure an adequate detector count rate from the most remote source.

The external mounting of the sources and detector has several disadvantages. In many applications, externally mounted hardware is not permitted to conserve space or for other reasons. The large sources required to obtain a radiation beam of sufficient intensity to cross the tank produces an external radiation field that either creates a health hazard for personnel stationed near the tank or causes cross-talk errors in readout if the source on one tank directly irradiates a detector on an adjacent tank.

BRIEF DESCRIPTION

These disadvantages are overcome by the present invention wherein I provide a radiation detector centrally located inside the vessel or tank and a plurality of radiation sources positioned on the vessel around the detector. In a specific embodiment, I provide a uniform coating of radioactive material around the inside of the vessel and a scintillation detector at the center thereof. In this manner, some material, regardless of its position in the vessel, always attenuates the detected radiation field. The centrally-located detector permits the use of source material of relatively low curie strength, reducing both the cost of the gauge and the health hazard to personnel, and, at the same time improving the measuring accuracy of the present invention.

OBJECTS

Accordingly, it is a primary object of the present invention to provide an improved radiation fill gauge.

It is also an object of the present invention to provide a fill gauge requiring substantially no external hardware.

It is another object of the present invention to provide a fill gauge capable of operating in either a normal or a zero gravitational environment.

It is yet another object of the present invention to provide a fill gauge permitting a reduction in cross-talk error.

It is still another object of the present invention to provide a fill gauge that permits the use of a relatively weak source of radiation and substantially reduces the external radiation field intensity.

It is an additional object of the present invention to provide a fill gauge that is simpler to construct, calibrate, and maintain than prior art devices of a similar nature.

FIGURE DESCRIPTION

DISCRETE SOURCE EMBODIMENT

Figure 1:
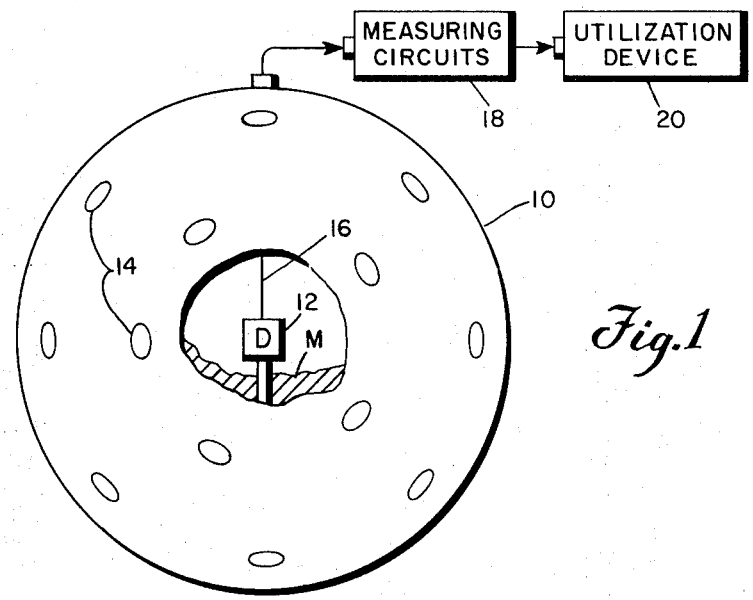
FIG. 1 is an elevation view partly diagrammatic of a fill gauge constructed in accordance with one embodiment of the present invention.

With reference now to the drawings and specifically to FIG. 1, a spherical vessel 10 is shown partially filled with material M. It is desired to know how much material is located in the vessel 10. If the location of the material in the tank is predictable, the measurement problem is not so great as it is when the material moves randomly around the inside of the vessel. In a normal G environment, gravitational forces cause the material M to fall to the bottom of the vessel and a fill height gauge will provide a signal proportional to fill volume. This type gauge will generally not work in a zero-G environment since the material's position cannot be referenced to any fixed datum.

My gauge will operate in any gravitational environment since it is insensitive to the spatial orientation of the material M within the vessel 10. I accomplish this position insensitivity by positioning a single radiation detector 12 substantially in the center of the vessel 10 so that it responds to radiation coming from substantially all directions. A plurality of sources of radiation 14 are positioned completely around the detector 12 to direct radiation toward the detector 12 from all sides of the vessel 10. The sources 14 direct radiation continuously toward the center of the vessel 10. The detector 12 is located then at the focal point of the radiation flux generated by the surrounding sources 14. Therefore, if there is any material M in the tank, it will, regardless of its position, intercept at least some portion of the radiation flux and thus cause a decrease in the detector response. Moreover, by surrounding the detector 12 in this manner, I can employ sources of less intensity than would be required if the radiation had to travel all the way across the vessel 10.

The detector 12 generates a signal that is proportional to the amount of radiation flux striking it which is a function of the amount of material located between the detector 12 and the sources 14. This signal is transmitted over line 16 to a measuring circuit 18. A utilization device 20 may be, for example, a recorder for registering an indication of material fill, a meter, or a control system for maintaining a predetermined fill condition in the vessel 10.

CONTINUOUS SOURCE EMBODIMENT

While the measurement accuracy of the foregong embodiment can be improved by using a large number of sources, I have found it more convenient to employ a continuous source of radiation, i.e. one that is distributed over the entire inside wall surface of the vessel 10.

Figure 2:
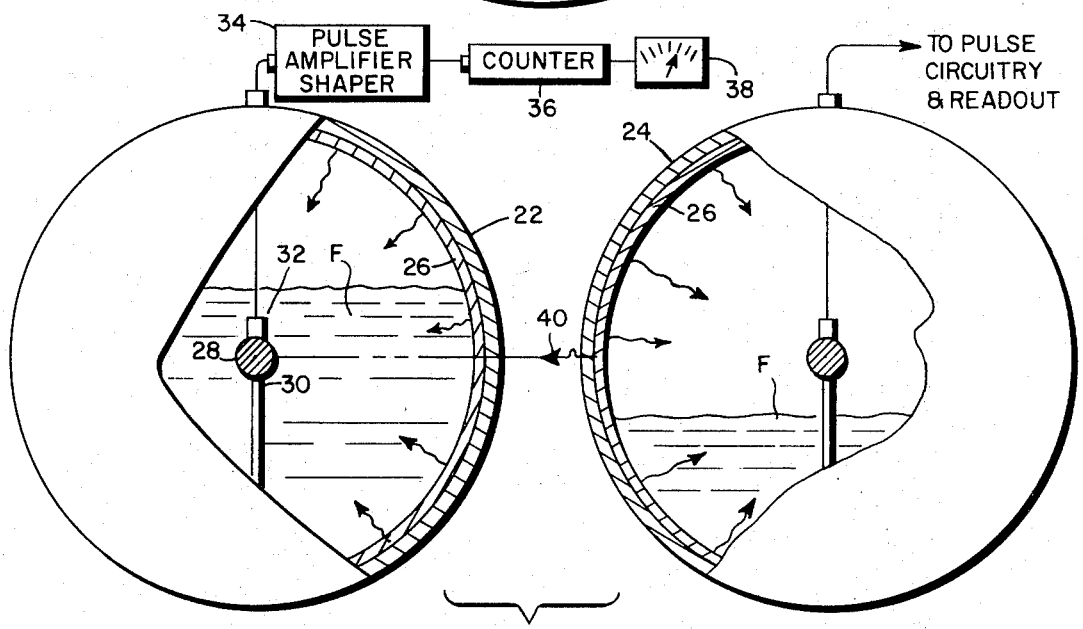
FIG. 2 is an elevation view of an alternative embodiment of the present invention.

In FIG. 2, two tanks 22 and 24 for liquid fuel F are shown side by side and broken away to reveal a radioactive coating 26 deposited on the inner wall thereof. The coating 26 may be paint or a glass or ceramic material containing a particulate radioisotope, such as cobalt 60, compounded thereinto. The glass or ceramic host material is chosen when a highly corrosive fuel is to be measured. If a less penetrating radiation is desired, say a relatively light-weight fuel is to be measured, a beta-emitting isotope such as strontium-yttrium 90 may be used. A stainless steel coating can be applied over the radioactive compound as a preservative to further reduce the eroding effect of corrosive fuels that might otherwise, in time, wear away sufficient radioisotope to upset the calibration of the instrument.

To detect radiation transmitted by the coating 26 through the fuel F, a sphere of scintillating crystal material 28 is mounted on a support 30. Other detectors such as Geiger Mueller tubes or ionization chambers may be used with substantially equal utility. The sphere responds to radiation arriving over a solid angle approaching $4\pi$ steradians. A photomultiplier tube 32 is coupled to the crystal 28 to convert the light energy induced therein by radiation into electrical pulses that are amplified and shaped by a unit 34 for counting by a counter 36. The detected count rate will be inversely proportional to the amount of fuel F in the tank 22. The continuous surface coating 26 precludes the possibility that globules of fuel might locate out of the radiation flux and fail to reduce the detected pulse rate. With this source-detector geometry, only radiation modified by the material reaches the detector.

Not only does my interior detector construction gauge provide accurate fill data regardless of how the fuel is spatially distributed but it also reduces cross-talk, i.e. radiation coupling to the crystal 28 of one tank 22 from the source material of the adjacent tank 24. It can be seen that radiation 40 from the coating 26 of tank 24 has to travel through at least two thicknesses of metallic tank shell to reach detector 28. Any fuel F in the tank 22 in this path further reduces the intensity of radiation 40 so that its effect upon the detected signal is negligible. In prior art constructions wherein externally mounted sources and detectors were employed, the detector of one tank was often positioned near the source of an adjacent tank and the detector count rate was increased by direct irradiation. The indicated fill was accordingly erroneously low.

ALTERNATIVE DESIGNS

Figure 3:
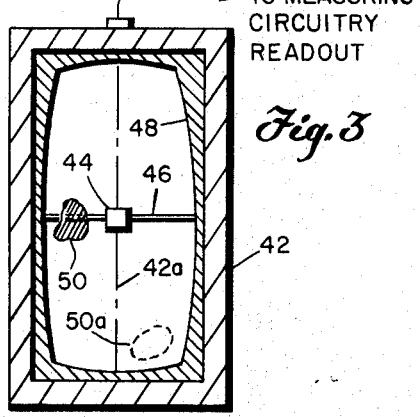
FIG. 3 is a sectional view of a fill gauge for a cylindrical vessel.
Figure 4:
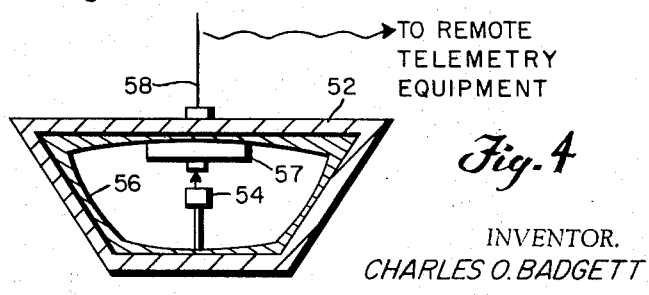
FIG. 4 is a sectional view showing another alternative embodiment of the present invention.

Referring to FIGS. 3 and 4 my invention can take on the constructions therein illustrated.

For example, in FIG. 3, a cylindrical vessel 42 may be adapted with my invention by mounting a solid state radiation detector 44 on the axis 42a of vessel 42 mid-way between the ends thereof by means of spiders 46. The detector 44 may be constructed of any of the well-known semiconductor materials that provides an electrical signal in response to an irradiating radiation.

Since all parts of the interior of vessel 42 are not equidistant from the detector 44, it may be necessary to contour the radiation source 48 applied to local surface areas of the inside wall of the vessel 42. Lesser source activity is required on local wall areas near the detector 44 than at the more remote base regions of the vessel 42. Either the local density of the radioisotope or the amount per unit area can be varied to provide the desired radiation contour pattern. For simplicity, I illustrate the thickness of the coating 48 as being variable.

With this construction, the locally-intense radiation originating at the remote base regions compensates for the increased distance it must travel to the detector 44. A globule of fuel 50 will cause substantially the same reduction in detected radiation whether it is located near the detector 44 or at position 50a. The construction of measuring circuitry for translating the electrical signal of the detector into a visual indication will be obvious to one skilled in the art.

In FIG. 4 is shown a fuel tank 52 of trapezoidal cross-section such as might be used in interplanetary or earth-orbiting space vehicles. A contoured radioactive coating 56 provides the desired radiation field as explained in reference to FIG. 3. A semiconductor radiation detector 54 is positioned in the center of the tank 52 to receive radiation from the coating 56. In this embodiment, an electronic signal-processing unit 57 may be mounted inside the vessel 52 and the only external hardware is an antenna 58 which serves to transmit an R.F. signal, modulated in accordance with the fuel fill data, to ground-based telemetry receivers. Other source constructions for tanks of different geometrical configuration will be apparent to those skilled in the art.

SUMMARY OF ADVANTAGES

The novel central detector construction of my gauging apparatus permits:

(1) measurement in any gravitational environment
(2) reduction of the external radiation field, and
(3) a fill gauging accuracy not approached by known systems.

While certain and specific embodiments have been described herein, modifications may be made without departing from the true spirit and scope of the invention as set forth in the appended claims.

I claim:
1. Fill material measuring apparatus, comprising:
   a closed vessel having wall means completely enclosing said material,
   a coating of radioactive material deposited on the entire inside surface of said wall means for directing radiation in each direction from said wall means through said material toward the center of said vessel,
   scintillator detector means responsive to radiation derived from said material and positioned inside said vessel substantially at the center thereof for providing a signal proportional to the amount of said material in said vessel, the activity of the radiation and the relative position of the radiation and detector means being such that the detector means is uniformly irradiated with radiation of substantially the same activity from all directions with the vessel being uniformly filled, and
   means for utilizing said signal.

2. Apparatus as set forth in claim 1 in which said coating comprises:
a base layer of radioactive paint and a covering layer of preservative material to prevent erosion of said radioactive paint.

3. Apparatus as set forth in claim 1 in which said coating comprises:
a non-corrosive material having a predetermined amount of radioactive material bonded therein.

4. Apparatus as in claim 1 in which said scintillator detector means comprises a sphere of scintillating crystal located at the center of said vessel and a photomultiplier optically coupled to said sphere.

5. The apparatus of claim 1 wherein different portions of the wall means of said vessel are differently spaced from the detector means, the activity of the radioactive coating material on the different portions of the wall means being different and related to the distance between each wall means portion and the detector means so that the same amount of energy impinges on the detector means from each wall means portion with the container being uniformly filled.

References Cited
UNITED STATES PATENTS

| | | | |
|---|---|---|---|
| 2,830,183 | 4/1958 | Wolfe | 250—43.5 |
| 2,952,774 | 9/1960 | Howard | 250—83.6 |
| 2,967,942 | 1/1961 | Davis et al. | 250—106 |
| 2,981,841 | 4/1961 | Wheeler | 250—43.5 |
| 3,244,897 | 4/1966 | Schafer | 250—43.5 |

RALPH G. NILSON, Primary Examiner

M. J. FROME, Assistant Examiner

U.S. Cl. X.R.

250—71.5, 83.1, 106